March 25, 1969 — F. E. STUART, SR — 3,434,600
AGITATOR STRUCTURE FOR FILTER BED
Filed Jan. 24, 1966
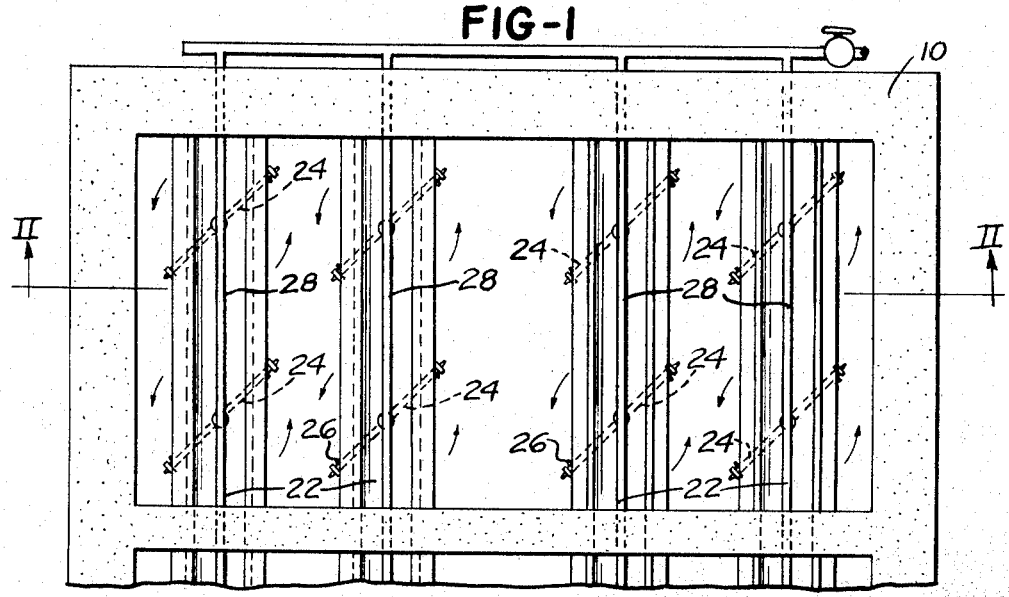
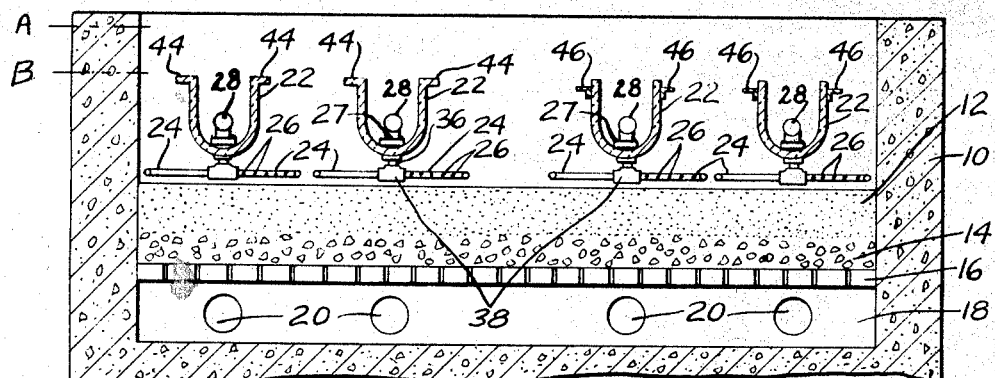
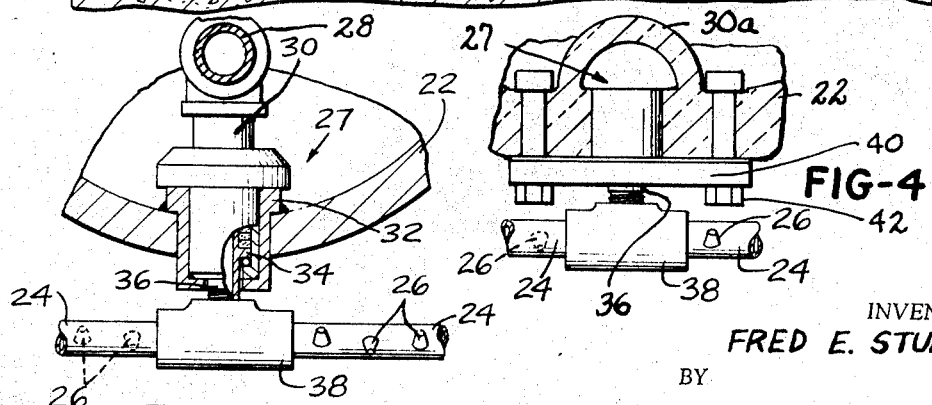
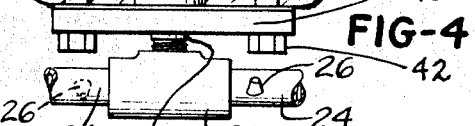
INVENTOR.
FRED E. STUART, SR
BY
Melvin A. Crosby

United States Patent Office 3,434,600
Patented Mar. 25, 1969

3,434,600
AGITATOR STRUCTURE FOR FILTER BED
Fred E. Stuart, Sr., Baltimore, Md. (523 N. Grandview
Ave., Daytona Beach, Fla. 32018)
Filed Jan. 24, 1966, Ser. No. 522,545
Int. Cl. C02b 3/02; B01d 23/24, 23/16
U.S. Cl. 210—272                         1 Claim

ABSTRACT OF THE DISCLOSURE

Filter arrangement having a tank with a filter bed, overflow troughs above the filter bed and rotary agitators suspended just above the top of the filter bed wherein the agitators are located beneath the troughs and are supported thereon and the supply pipes for the agitators extend along the troughs near the bottom thereof.

---

This invention relates to filters, such as sand filters, "Anthrafilt" and other granular or solid material, and is particularly concerned with washing of the filter during the backwashing operation.

Filter systems, such as filters for filtering large volumes of water employing large beds of granulated material, such as sand through which the water flows, usually by gravity, and which bed removes particles of foreign material from the water, are well known.

Periodically such filter beds are backwashed to remove the insoluble flocculated or settled material and it is common practice also to agitate and scour at least the upper portion of the sand bed to further loosen the accumulated material therefrom so that it can be carried away with the backwash water. The washing of the upper portion of the sand bed is usually accomplished by providing agitation means, either directly above the upper level of the bed, or just beneath the upper level of the bed, and which agitation means may advantageously comprise conduits having nozzles distributed therealong with the conduits being rotatable so the jets from the nozzles, as well as the conduits, will agitate the sand while supplying further water thereto, thus loosening the accumulated material therefrom so that it will be removed by the backwash water.

Normally, such conduits are suspended from the main supply conduit by bearing arrangements which permit the conduits to rotate. This type of construction is somewhat expensive and leaves the conduits suspended a substantial distance below the main supply conduits so that considerable lateral load is applied to the suspension which can lead to breakage or bending thereof, also corrosion occurs, so that considerable maintenance may be required for this conventional type of suspension. Bracing of the arrangement is thus necessary.

With the foregoing in mind, a primary object of the present invention is the provision of an improved arrangement for suspending rotary agitators in respect of a filter bed to be agitated thereby, which is more inexpensive and more compact than has heretofore been known and which, therefore, requires less maintenance and elimination of corrosion because it is underwater at all times, and which is more efficient in operation.

A particular object of the present invention is the arrangement of agitators of the nature referred to in direct association with overflow troughs making for a more compact assembly.

A particular object is the provision of a rotating agitator of the nature referred to in which the loads on the supporting bearings therefor, and on the supporting conduits therefor, are kept as low as possible.

These and other objects and advantages of the present invention will become more apparent upon reference to the following detailed description taken in connection with the accompanying drawings in which:

FIGURE 1 is a somewhat schematic plan view of a filter embodying the present invention;

FIGURE 2 is a vertical sectional view indicated by line II—II in FIGURE 1;

FIGURE 3 is a sectional view similar to FIGURE 2 but drawn at enlarged scale and showing the bearing support for one of the agitators; and FIGURE 4 shows a modification.

Referring to the drawings somewhat more in detail, 10 indicates a tank-like enclosure, concrete, for example, in which a bed 12 is formed. The upper portion of the bed consists of fine granular material, such as sand, "Anthrafilt" or other granular material, while the lower portion thereof at 14 may consist of relatively coarse aggregate, such as gravel. The coarse aggregate rests on blocks 16, which are porous, or which are provided with passages so that water flowing downwardly through the filter bed passes into chamber 18, whence it flows via conduit means 20 away from the filter.

Located within tank or container 10 is a plurality of overflow troughs 22 which are inoperative when the filter is filtering water, but which become operative when the filter is backwashed.

The filter is backwashed by passing water upwardly through the filter bed, which water will loosen up the filter bed and cause the upper level thereof to rise in tank or container 10 so that particles of accumulated material which have become entrapped on or in the filter bed during filtering are dislodged therefrom and are conveyed by the backwash water into overflow troughs 22. The troughs 22 drain away from the filter to a suitable drain connection not shown.

For further enhancing the efficiency of the backwashing operation, agitating means are provided which take the form of conduits 24 having nozzles 26 thereon.

Conduits 24, according to the present invention, are rotatably suspended from the bottom of troughs 22 by bearing means 27. Supply conduits 28 supply water under pressure up to, say, one hundred fifty pounds per square inch, to conduits 30 which extend downwardly into troughs 22 and communicate through bearings 27 with conduits 24.

The nozzles 26 are arranged on respectively opposite sides of the conduits 24 on opposite sides of the center of rotation of the conduits and the jets of water from the nozzles 26 thus cause the conduits 24 to rotate so as to cause agitation of the granular material of the filter bed and to dislodge all accumulated material therefrom. The conduits can be disposed beneath the upper level of the filter bed 12, as shown in FIGURE 2, or they can be disposed beneath the upper level of the filter bed.

In either case, when backwash water is supplied upwardly through the filter bed, the material of the filter bed will be lifted from its normal upper level and the granular material in the upper region of the filter bed, which carries the major portion of the filtered accumulated material and, in particular, that portion of the filtered out material which tends to adhere, will be above the agitators and thus will be agitated and cleaned thereby.

In addition, the nozzles 26 may include some that point somewhat downwardly, as shown in FIGURE 3, and this will effect agitation of the granular bed even beneath the plane of the agitators.

By arranging the agitators in the overflow or backwash troughs the bearings for the agitators become quite solidly supported or a part thereof as they are connected directly with the overflow or washwater troughs. Vibration of the system is reduced and there is no tendency for the pipes 30, leading downwardly from supply pipes 28, to bend or vibrate. Bracing of the conduits is thus not necessary.

The arrangement of the present invention makes it practical to make the agitators fairly small and to mount a plurality thereof in a filtering chamber, whereby more complete distribution of the agitating effect of the agitators is obtained than would be the case if only one or two larger rotary agitators were provided as has heretofore been customary.

As will be seen in FIGURE 3, the bearing means 27 may comprise a bearing housing 32 welded in place in the bottom wall of trough 22 with the bearing proper comprising the bearing elements 34 interposed between the housing 32 and the short conduit 36 by means of which the agitator is suspended from the bearing and/or become a part of a fiberglass washwater trough. Conduit 26 connects with a T fitting 38 from which the aforementioned conduits 24 extend.

The supply conduit 30 enters the bearing structure from the top and communicates with the interior of the rotary conduit 36 for supplying water under pressure to agitator conduits 24. Conduit 30 may lay in the bottom of the trough as shown in FIGURE 3, or it may be an integral part of the trough as at 30a in FIGURE 4.

As will be seen in FIGURE 4, the bearing means 27 may comprise a housing part 40 having flanges through which bolts 42 extend to secure the bearing housing to the bottom wall of the pertaining trough 22. In other respects the bearing arrangement of FIGURE 4 is the same as that of FIGURE 3.

Inasmuch as the agitators are relatively small and the support shafts therefor are short, no bracing of the structure is required and vibration thereof is at a minimum. Also, corrosion is reduced to a minimum because the agitators and the supply piping when the supply piping is arranged according to the present invention either within the washwater trough, or a part thereof, i.e., when the supply piping is beneath level A during filtering and beneath level B during backwashing. Thus, no oxygen from the air, which causes corrosion can get to the supply piping.

The troughs 22 which may be made of metal, fiberglass, plastics, concrete, etc., are inherently stiff because of the configuration thereof, and may be further stiffened by the provision of laterally out turned edges 44, as seen on the troughs on the left side of FIGURE 2, or may be stiffened by angles 46 attached to the sides of the trough near the top as seen on the two troughs toward the right side of FIGURE 2.

For welding the bearing housing in place, as in FIGURE 3, metal troughs would be employed, but for bolting the bearing housing in place, as in FIGURE 4, the troughs could be made of other metals, for example, fiberglass.

The troughs 22 are normally spaced on 6 ft. centers and the individual agitators would thus sweep a diameter of about 5 ft. 6 inches.

It will be understood, however, that adjacent agitators could be arranged at respectively different levels so that the ends thereof could overlap thereby permitting the agitators to be made longer than the spacing between adjacent troughs.

This modification could readily be arrived at by providing longer conduits 36 for some of the agitators so as to dispose them below adjacent agitators.

In any case, by supporting the agitators on the bottoms of the troughs, according to the present invention, it is no longer necessary to provide bracing for the supply pipes as has heretofore been the case, such bracing often being connected with the wash troughs. When wash troughs are made of relatively thin material, or when they are made of fiber glass, the connecting of braces thereto is not only difficult, but such bracing arrangements may damage the troughs because of the loads placed thereon and the vibration of the agitator system.

It will be understood that this invention is susceptible to modification in order to adapt it to different usages and conditions; and accordingly, it is desired to comprehend such modifications within this invention as may fall within the scope of the appended claim.

I claim:

1. In a filter system; a bed of granular material for downward flow of liquid therethrough during filtering and through which liquid is forced upwardly during backwashing of the bed, upwardly opening wash water troughs extending substantially horizontally over the bed into which the backwash liquid overflows during the said backwashing, rotary agitator means in said bed and disposed closely beneath said troughs for supplying jets of fluid during backwashing to scour the granular material of at least the upper portion of the bed to remove accumulated material therefrom so that it will flow off with the backwash liquid into said wash water troughs, supply conduit means in the form of a passage integrally formed in and extending along the bottom of each of said troughs, means rotatably supporting said agitator means on said troughs, and means establishing fluid communication between each agitator means and the supply conduit means on the respective trough supporting the said agitator means for a supply of fluid to said agitator means upon a supply of fluid to said supply conduit means, each of said supply conduit means and the respective trough consisting of a single piece construction.

References Cited

UNITED STATES PATENTS

| 2,296,824 | 9/1942 | Ashworth | 210—273 X |
| 2,309,917 | 2/1943 | Palmer | 210—272 |

SAMIH N. ZAHARNA, *Primary Examiner.*

U.S. Cl. X.R.

210—273